Jan. 6, 1959

K. KUEMMERLING 2,867,363

SAW SCABBARD

Filed April 29, 1957

INVENTOR.
Karl Kuemmerling
BY
Frease & Bishop
ATTORNEYS

United States Patent Office 2,867,363
Patented Jan. 6, 1959

2,867,363

SAW SCABBARD

Karl Kuemmerling, Canton, Ohio

Application April 29, 1957, Serial No. 655,782

3 Claims. (Cl. 224—2)

The invention relates to scabbards for saws, and more particularly to such a scabbard having detachable guard means therein for the teeth of the saw blade.

Scabbards of this general type are especially adapted for use by the tree surgeons, arborists, nurserymen, orchardists and the like, for safety and conveniently carrying a saw up into a tree or other high place.

Such scabbards as are in use at the present are usually formed of leather, and it has been found that in use they quickly become damaged by the saw teeth engaging the inner surfaces of the leather scabbard.

In my prior Patent No. 2,524,110 dated October 3, 1950, I provided longitudinal guard strips upon the inner side walls of the scabbard to hold the saw blade spaced from said side walls of the scabbard. While these guard strips prevented the saw teeth from contacting and damaging the side walls of the scabbard, they did not prevent the saw teeth from cutting into the edges of the scabbard when the two side walls are stitched or otherwise connected.

This is especially true as the saw is inserted into or removed from the scabbard, at which times there is a tendency for the saw teeth to cut into the spacer strip or other seam construction at the edge of the scabbard.

It is therefore an object of the present invention to provide guard means for preventing the teeth of the saw blade from cutting into the seam at the edges of the scabbard.

Another object is to provide such a guard which is removable and replaceable.

A further object is to provide a guard of this character which is reversible so that when worn by the teeth of the saw it may be removed and replaced in reverse position.

A still further object is to provide such a guard formed of two similar members of leather or the like attached or otherwise connected together along the longitudinal median line thereof.

Another object of the invention is to provide a guard of the character referred to which is detachably mounted within a casing at the edge of the scabbard whereby the guard may be removed and reversed in position after one portion thereof has become worn.

A further object is to provide a guard of this character which may be reversed end for end and side for side, whereby as one side of the guard is damaged by use it may be reversed to present the opposite side and as one end of the guard is damaged it may be reversed end for end to present the opposite end for use.

The above objects together with others which will be apparent from the drawing and following description, or which may be later referred to, may be attained by constructing the improved saw scabbard in the manner hereinafter described in detail and illustrated in the accompanying drawing.

In general terms, the invention may be described as comprising a scabbard forming two side members formed of leather such as cowhide or the like, connected together at their longitudinal edges by stitching or the like.

A spacer strip, of leather or the like, is preferably located between the edges of the side members toward which the teeth of the saw blade are disposed when the saw blade is inserted into the scabbard.

This spacer strip terminates at a point spaced from the upper end of the scabbard, and a substantially U-shape casing of leather or the like is attached to the adjacent edge portions of the side members of the scabbard above this spacer strip.

The saw tooth guard comprises generally a pair of similar rectangular members, of leather or the like, stitched together at their longitudinal median line. This guard is slidably inserted into the U-shape casing, one member of the guard being bent into substantially U-shape and located between the adjacent edge portions of the side members of the scabbard, the other or outer member of the guard being received between the adjacent edge portions of the side members and the casing.

As a saw blade is inserted into or removed from the scabbard, the teeth of the saw blade will tend to contact the inner member of the guard, thus preventing the saw teeth from coming into contact with the spacer strip or other seam construction at this edge of the scabbard.

Having thus described the invention, reference is now made to the accompanying drawing, in which:

Figure 2:
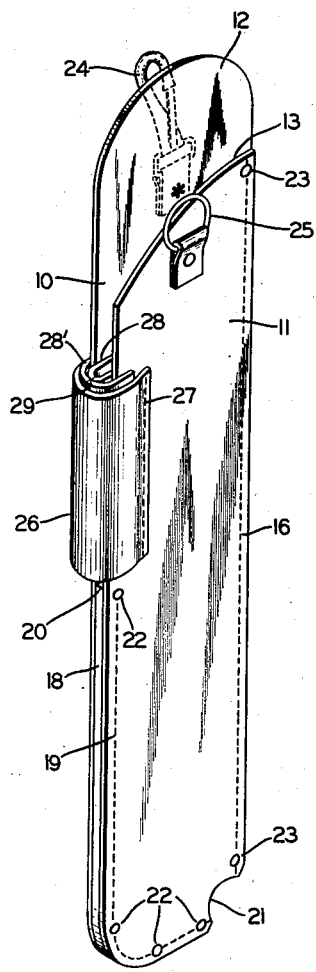
Fig. 2 is an enlarged perspective view of the scabbard.
Figure 1:
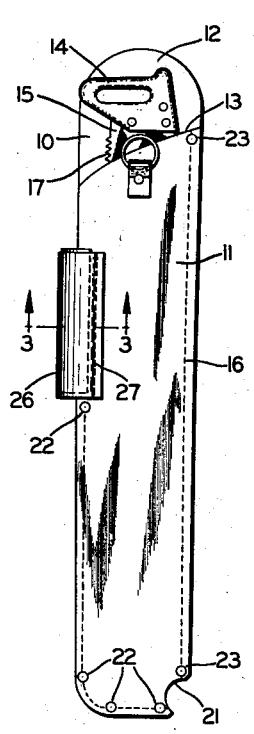
Fig. 1 is a side elevation of a saw scabbard embodying the invention, showing a saw blade located therein.
Figure 3:
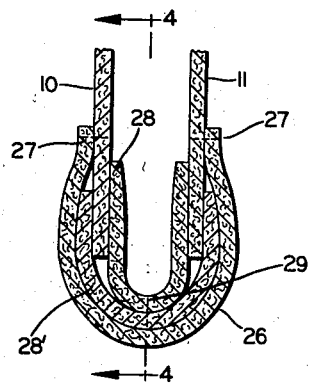
Fig. 3 is an enlarged fragmentary sectional view through the saw tooth guard and casing therefor, showing the adjacent edge portions of the side members of the scabbard, taken on line 3—3, Fig. 1.
Figure 4:
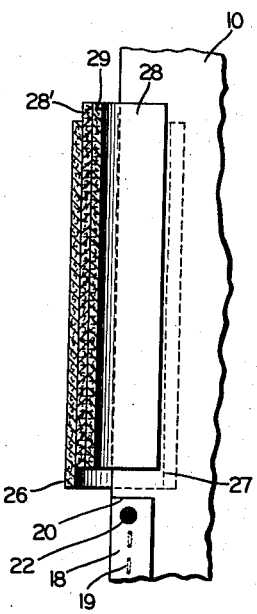
Fig. 4 is a fragmentary longitudinal sectional view through the saw guard and casing therefor, taken as on the line 4—4, Fig. 3.
Figure 5:
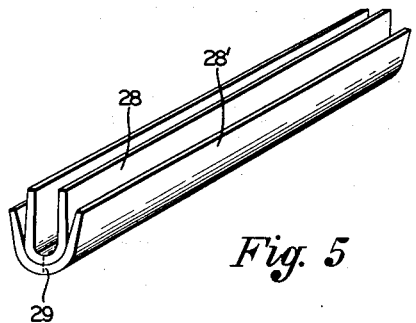
Fig. 5 is a detached perspective view of the saw tooth guard.

Referring now more particularly to the embodiment of the invention illustrated in the drawing, in which similar numerals refer to similar parts throughout, the scabbard includes the two side members 10 and 11, preferably formed of leather such as cowhide or the like.

The inner side member 10, which is carried toward the body of the user when the scabbard is worn, has the substantially rounded upper end portion 12 extending some distance beyond the arcuate upper end 13 of the outer side member 11. This permits the handle 14 of the saw 15 to remain exposed, whereby it may be easily grasped to remove the saw from the scabbard.

The longitudinal edges of the side members 10 and 11 of the scabbard are stitched or otherwise connected together. As shown in the drawing the edges of the side members, toward which the back of the saw blade is disposed, are connected together as by the stitching 16.

The opposite longitudinal edges of the side members toward which the saw teeth 17 are disposed, are preferably separated as by a spacer strip 18 of leather or the like, which is stitched between the edges of the side members as indicated at 19. This spacer strip 18 terminates at a point spaced from the upper end of the scabbard as indicated at 20.

A clean-out opening 21 may be formed in the lower end of the scabbard to permit removal of sawdust, chips, twigs, leaves and the like from the scabbard, as disclosed in my prior patent above referred to.

The spacer strip 18 may extend around the bottom of the scabbard to the clean-out opening 21 and the stitching 19 may be reinforced by rivets 22 located through the adjacent edges of the side members and through the spacer strip. The stitching 16 at the other edge of the scabbard may also, if desired, be reinforced as by rivets 23.

A harness snap 24, of conventional design, or some equivalent device, may be attached to the upper portion of the side wall 10 for detachable connection to the belt of the user, so that the scabbard with the saw therein may be conveniently worn, permitting the use of both hands for climbing into trees, upon ladders or the like.

If desired, a ring or the like as indicated at 25 may be attached to the outer side of the scabbard near the upper end of the outer side member 11, for the same purpose as disclosed in my prior patent above referred to, although the same has no connection with the saw tooth guard to which the present invention pertains.

For the purpose of detachably mounting the saw tooth guard upon the scabbard, a substantially U-shape casing 26, of leather or the like, is located above the spacer strip 20 and attached to the outer surfaces of the side members 10 and 11 of the scabbard at points spaced from the adjacent edges thereof, as by stitching indicated at 27.

The saw tooth guard is formed of two similar substantially rectangular members 28 and 28' of leather or the like, stitched or otherwise attached together along their median longitudinal lines as indicated at 29.

In order to insert the saw tooth guard into the casing 26, the guard is bent into substantially U-shape, as shown in the drawing, and slidably inserted from the top of the casing. The edges of one member of the guard as indicated at 28, are received between the adjacent end portions of the side members 10 and 11, and the edges of the other member as indicated at 28', are received between the casing 26 and the outer surfaces of the side members 10 and 11.

With the saw tooth guard located in the casing as shown in the drawing, when a saw is inserted into the scabbard, or removed therefrom, the saw teeth may come into contact with the upper end of the inner member 28 of the saw tooth guard.

In time, when this upper end portion of the inner member 28 becomes badly damaged, the guard may be removed from the casing and folded or bent in the opposite direction so that the member 28' becomes the inner member and the member 28 becomes the outer member, and the guard may again be inserted into the casing of the scabbard.

After one end of the guard is damaged by further use, the guard may be again removed from the casing and turned end for end and re-inserted into the casing, presenting a new surface to the teeth of the saw. After this surface becomes damaged, the guard may be removed from the casing and folded in the opposite direction and again replaced in the casing.

It will be seen that by reversing the position of the members 28 and 28' and reversing the position of the saw tooth guard end for end, four different surfaces of the saw guard may be used in succession.

From the above it will be evident that a simple, efficient and easily operated saw tooth guard is provided, which is quickly removable and reversible and easily replaceable, and which prevents cutting of a permanent portion of the scabbard by the teeth of the saw.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. A scabbard for saws, comprising two side members, means connecting the edge portions of the side members together, said means terminating at a point spaced from the top of the scabbard at one edge of the scabbard, a substantially U-shape casing connected to the outer surfaces of said side members at points spaced from the adjacent edges thereof at said one edge of the scabbard and above said termination point, and a detachable reversible saw tooth guard longitudinally slidably located in said casing, said saw tooth guard being formed of leather and bent into substantially U-shape, the edge portions thereof being located between the casing and the outer surfaces of the side members.

2. A scabbard for saws, comprising two side members, means connecting the edge portions of the side members together, said means terminating at a point spaced from the top of the scabbard at one edge of the scabbard, a substantially U-shape casing connected to the outer surfaces of said side members at said one edge of the scabbard and above said termination point, and a saw tooth guard longitudinally slidably located in said casing, said saw tooth guard comprising a pair of similar substantially rectangular leather members attached together at their longitudinal median line and bent into substantially U-shape, the edge portions of one member being located between the adjacent edge portions of the side members and the edge portions of the other member being located between the casing and the outer surfaces of the side members.

3. A scabbard for saws, comprising two side members, means connecting the edge portions of the side members together, said means terminating at a point spaced from the top of the scabbard at one edge of the scabbard, a substantially U-shape casing connected to the outer surfaces of said side members at points spaced from the adjacent edges thereof at said one edge of the scabbard and above said termination point, and a saw tooth guard longitudinally slidably located in said casing, said saw tooth guard being formed of two similar members of leather joined at their longitudinal median line and bent into substantially U-shape with one of said members folded within the other member, the edge portions of the inner member being located between the adjacent edge portions of the side members and the edge portions of the outer member being located between the U-shape casing and the outer surfaces of the side members.

References Cited in the file of this patent

UNITED STATES PATENTS

| | | |
|---|---|---|
| 757,740 | Happe | Apr. 19, 1904 |
| 2,524,110 | Kuemmerling | Oct. 3, 1950 |
| 2,756,790 | Synbad | July 31, 1956 |
| 2,792,163 | Kidwell | May 14, 1957 |